United States Patent
Kwon et al.

(10) Patent No.: US 8,416,867 B2
(45) Date of Patent: Apr. 9, 2013

(54) INTERFERENCE CANCELLATION WITH MU-MIMO SCHEME IN SC-FDMA SYSTEM

(75) Inventors: Hyuck Chan Kwon, Seoul (KR); Hee Gul Park, Yongin-si (KR); Jung Seung Lee, Uiwang-si (KR); Byoung Seong Park, Incheon (KR)

(73) Assignee: LG-Ericsson Co., Ltd., Seoul (KR)

( * ) Notice: Subject to any disclaimer, the term of this patent is extended or adjusted under 35 U.S.C. 154(b) by 593 days.

(21) Appl. No.: 12/623,658

(22) Filed: Nov. 23, 2009

(65) Prior Publication Data

US 2011/0122760 A1    May 26, 2011

(51) Int. Cl.
*H04K 1/10* (2006.01)

(52) U.S. Cl.
USPC .......... 375/260; 375/316; 375/346; 455/63.1; 455/296; 714/758; 707/699

(58) Field of Classification Search .............. 375/260, 375/316, 346; 455/63.1, 296; 714/758; 707/699
See application file for complete search history.

(56) References Cited

U.S. PATENT DOCUMENTS

| | | | |
|---|---|---|---|
| 2004/0199850 A1* | 10/2004 | Yi et al. | 714/758 |
| 2008/0212464 A1* | 9/2008 | Kim et al. | 370/210 |
| 2009/0219876 A1* | 9/2009 | Kimura et al. | 370/329 |

* cited by examiner

*Primary Examiner* — Sam K Ahn
*Assistant Examiner* — Leila Malek
(74) *Attorney, Agent, or Firm* — KED & Associates LLP

(57) ABSTRACT

An apparatus and a method for interference cancellation using a multi-user multiple input multiple output (MU-MIMO) scheme in a single carrier frequency division multiple access (SC-FDMA) system are disclosed. Received data of every terminal are classified into first received data and second received data. The first received data has lower reliability and the second received data has higher reliability than the first received data. The second received data is transmitted to an upper layer. Interference signals are formed with the second received data based on a channel estimation value. The interference signals are removed from the first received data, and the interference signal free first received data is transmitted to the upper layer.

7 Claims, 5 Drawing Sheets

INTERFERENCE CANCELLATION WITH MU-MIMO SCHEME IN SC-FDMA SYSTEM

BACKGROUND OF THE INVENTION

1. Field

Embodiments of the present invention may generally relate to a communication system based on a single carrier frequency division multiple access (SC-FDMA). More particularly, embodiments of the present invention may relate to devices and methods of cancelling interference by adopting a subtractive interference cancellation method and a multiuser multiple input multiple output (MU-MIMO) scheme.

2. Background

For various demands on multimedia services in a wireless communication environment, a lot of progress has been made in transmitting a large amount of data at high speeds. The wireless communication environment has lower reliability compared to a wired communication environment due to propagation attenuation, shadowing, time-varying noise, multipath Interference, multiuser Interference.

An antenna device adopting a multiple input multiple output (MIMO) scheme includes multiple antennas in a transceiver. Each antenna receives independent information so that it is possible to transmit data at high speed within limited frequencies. In the MIMO antenna device, receiving signals of one antenna may have interference caused by other antennas. To remove the interference in the received signals, two methods can be adopted. A first method is a kind of non-subtractive interference cancellation, known as a "one-shot multiple-antenna detection method." In the first method an inverse matrix is calculated with correlations among channels of the multiple antennas to remove the interference. A second method is known as subtractive interference cancellation. According to the second method, signals transmitted from one transmitting antenna are detected. The detected signals are used to reconstruct received signals of an antenna of interest to remove the interference in the receiving signals.

In non-subtractive interference cancellation, rank or orthogonal factors of a channel matrix are important elements which determine the performance of the MIMO antenna device. For example, if the channel matrix has good orthogonality the receiving signals have less mutual interference signals and the MIMO antenna device shows good performance. However, in the case of bad orthogonality, lots of the mutual interference signals may be included in the receiving signals, and the performance of the MIMO antenna device is degraded. In order to prevent degradation of the MIMO device, an estimation of mutual orthogonal components is needed to perform scheduling when the non-subtractive interference cancellation is adopted.

The subtractive interference cancellation has been widely studied in a code division multiple access (CDMA) system. In this method, the signals transmitted from multiple terminals (user equipments) are analyzed and used like multiple transmitting antennas. Thus, multiple access interference can be reduced, and capacity and performance of the CDMA system can be improved. However, as the number of terminals increases, it is not easy to configure a real system due to complexity.

The 3$^{rd}$ Generation Partnership Project (3GPP) long term evolution (LTE), of which standards have been settled, adopts a downward orthogonal frequency division multiple access (downward OFDMA) scheme and an upward SC-FDMA scheme instead of the CDMA scheme in transmitting and receiving signals in consideration of suitability for wideband frequencies. Also, to maximize the efficiency at each frequency, a single input multiple output (SIMO) scheme and the MIMO scheme may be applied to the up-link and the down-link. Specifically, in the up-link, a multi-user MIMO (MU-MIMO) may be applied to enhance the frequency efficiency.

FIG. 1 shows comparative performances of two terminals randomly selected in the up-link, which adopts one of the MU-MIMO scheme and the SIMO scheme, respectively. Results shown in FIG. 1 are obtained in assumptions that coding rates of quadrature phase shift keying (QPSK) and of 16 quadrature amplitude modulation (QAM) are 0.67 and 0.76, respectively. 432 subcarriers are used in this example. Referring to FIG. 1, additional power of 4 dB (QPSK) and 7 dB (16 QAM) is needed when scheduling signals received from the terminal of the SIMO scheme in a scheme of the MU-MIMO.

FIG. 2 shows a schematic diagram of scheduling and resource allocation of a user equipment UE in an up-link. In allocating the resources, the SIMO scheme is applied to UE1 and UEs 4 to 6 and the MU-MIMO scheme is applied to UE 2 and UE3. In the case of UE2 and UE3 which are scheduled in accordance with the MU-MIMO scheme, it is not able to discriminate the UE2 and UE3 by demapping the subcarriers since UE2 and UE3 use a common frequency band. Thus, an equalizer should be used to discriminate UE2 and UE3. One consideration may be to adopt a scheme in which a scheduler checks mutual relationships among channels of users and groups the users into pairs. The users that have less of a mutual relationship are included in one pair. However, this scheme cannot be configured in a real system, since it is extremely rare that there is no mutual relationship between user channels due to frequency selective fading generated in wide band communication. Further, in the case of an LTM system, which has been developed to admit hundreds of users or more, the mutual relationship should be checked with huge combinations of users. Thus, random scheduling should be used in a communication system adopting the MU-MIMO scheme, and the performance of the communication system is degraded by about 4 to 7 dB compared to the communication system adopting the SIMO scheme.

SUMMARY OF THE INVENTION

The present invention provides an apparatus and a method for interference cancellation using a multi-user multiple input multiple output (MU-MIMO) scheme in a single carrier frequency division multiple access (SC-FDMA) system.

A single carrier frequency division multiple access (SC-FDMA) system may comprise: a receiving data forming unit configured to form channel estimation values and receive data of a plurality of terminals with receiving signals transmitted from respective terminals, wherein the receiving signals include cyclic prefixes (CPs), cyclic redundancy codes (CRCs) and subcarriers; a selective output unit configured to classify the data of a plurality of terminals into first received data and second received data, wherein the first received data has lower reliability and the second received data has higher reliability than the first received data; an interference signal generating unit configured to form interference signals from the second received data based on the channel estimation value; and a single input multiple output (SIMO) receiving unit configured to remove the interference signals from the first received data and to transmit the interference signals free first received data to an upper layer.

A method of interference cancellation in a single carrier frequency division multiple access (SC-FDMA) system, may comprise: a) at a receiving data forming unit, forming channel estimation values and receiving data of a plurality of terminals with receiving signals transmitted from respective terminals, wherein the receiving signals include cyclic prefixs (CPs), cyclic redundancy codes (CRCs) and subcarriers; b) at a selective output unit, classifying the receiving data into first receiving data and second receiving data, wherein the first receiving data have lower reliability and the second receiving data have higher reliability than the first receiving data and outputting channel estimation value selective signals corresponding to the first and the second receiving data for extracting the interference signals for extracting the interference; c) at a selective output unit, transmitting the second receiving data to an upper layer; d) at an interference signal generating unit, forming interference signals from the second receiving data based on the channel estimation; and e) at a single input multiple output (SIMO) receiving unit, removing the intereference signals from the first receiving data and transmitting interference signal free first receiving data to the upper layer.

BRIEF DESCRIPTION OF THE DRAWINGS

Arrangements and embodiments are described in detail with reference to the following drawings in which like reference numerals refer to like elements and wherein.

DETAILED DESCRIPTION

Embodiments of the present invention provide an apparatus and a method for interference cancellation using a multi-user multiple input multiple output (MU-MIMO) scheme in a single carrier frequency division multiple access (SC-FDMA) system.

Figure 1:
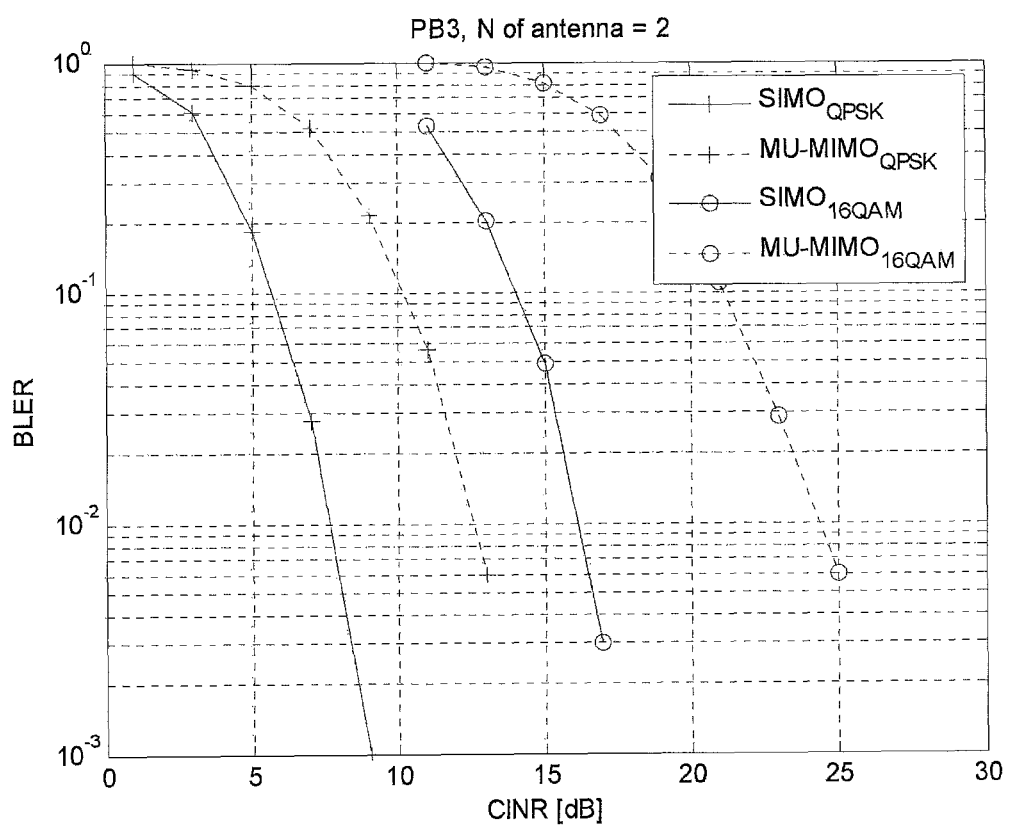
FIG. 1 shows comparative performances of two terminals randomly selected in an up-link, which adopt one of the MU-MIMO scheme and the SIMO scheme, respectively.
Figure 2:
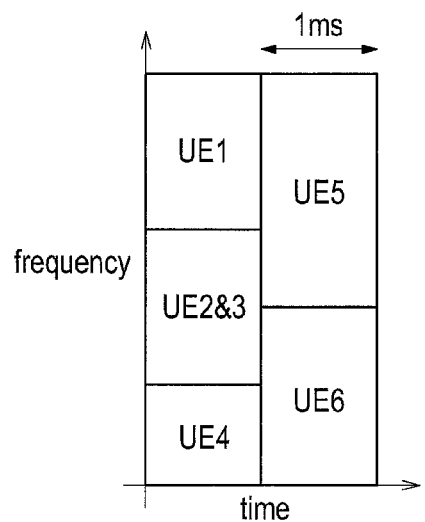
FIG. 2 shows schematic diagram of scheduling and resource allocation of a user equipment (terminal)
Figure 3:
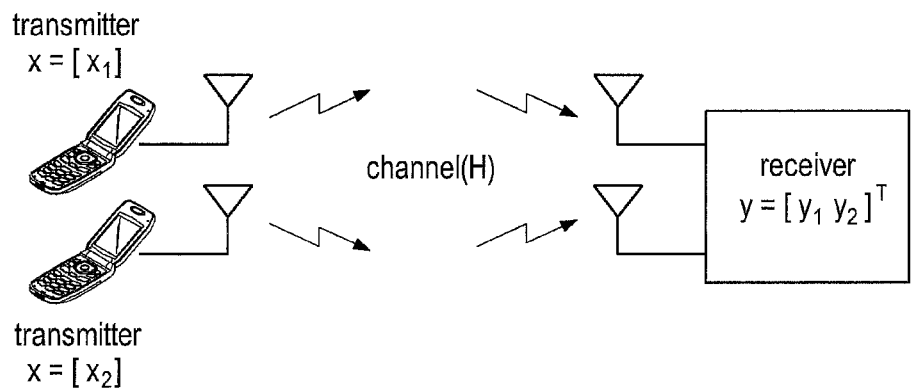
FIG. 3 is a block diagram of in a single carrier frequency division multiple access (SC-FDMA) system for scheduling two terminals in accordance with present invention.

A multiple input multiple output (MIMO) system includes multiple transmission antennas and receipt antennas, which transmit and receive independent signals, to guarantee a high speed of data transmission in an environment with limited frequencies. As shown in FIG. 3, a 2 X 2 MU-MIMO system may be adopted for communication. The system includes two transmitters (terminals) and two receivers (receiving antennas). A channel response matrix H(k) may be used to estimate channel values for every terminal using equation 1.

$$H(k) = [H_1(k) H_2(k)] = \begin{bmatrix} h_{11}(k) & h_{12}(k) \\ h_{21}(k) & h_{22}(k) \end{bmatrix} \quad (1)$$

In Equation 1, Hn denotes a channel response of the terminal "n", and $h_{xy}$ denotes a channel response of receiving antenna "x" to transmission antenna "y".

Figure 4:
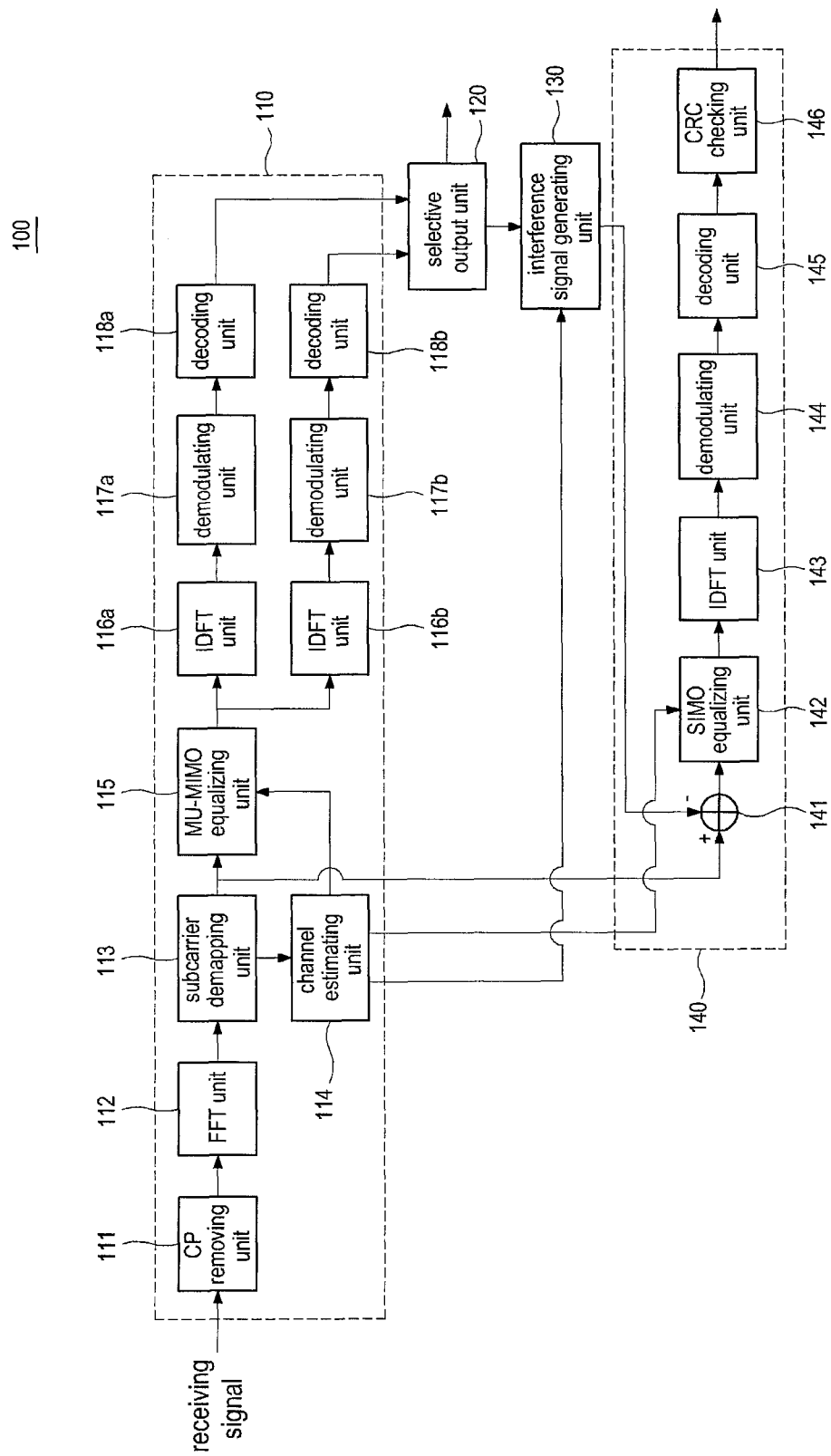
FIG. 4 is a block diagram of an interference cancellation device in the SC-FDMA system.

FIG. 4 is a block diagram of interference cancellation device 100 adopting the MU-MIMO scheme in the SC-FDMA system. Receiving data forming unit 110 may receive receiving signals transmitted from terminals and may form the channel estimation values as well as receiving data of every terminal with the receiving signals. The receiving signals may be expressed in a time-domain and may include cyclic prefix (CPs) for cancelling an interference caused by multi-path channels, cyclic redundancy codes (CRCs) and subcarriers. CP removing unit 111 of receiving data forming unit 110 may remove the CPs from the receiving signals. Fast Fourier transforming (FFT) unit 112 may perform a transformation from the time-domain to a frequency-domain for the receiving signals to form conversion signals R(k), given as equation 2.

$$R(k) = FFT(r(n)) k=0,1,\ldots,N-1 \quad (2)$$

In Eq. 2, "N" denotes a size of the FFT determined by the bandwidth of the system. For an instance, if the bandwidth of the system is 10 MHz, "N" may be 1024.

Subcarrier demapping unit 113 may form demapping signals Y(k), given as equation 3, by extracting only the subcarriers transmitted from a terminal from the conversion signals R(k).

$$Y(k) = R(n) n = k + N\_Offset\ k=0,1,\ldots,N_u-1 \quad (3)$$

In Eq. 3, "$N_u$" denotes the total number of subcarriers allocated to the transmission terminal, and "N_Offset" represents the starting point of the subcarriers.

Channel estimating unit 114 may receive the demappling signals and estimate the channel values of every terminal. MU-MIMO equalizing unit 115 may receive the channel response matrix H(k) denoting the estimated channel values and the demappling signals Y(k) to perform an equalizing process for compensating a wireless channel and to form first channel compensation signals X(k) of every channel. The first channel compensation signals are obtained by the minimum mean squared error (MMSE) scheme, which is one kind of non-subtractive interference cancellation method having less complexity, in the MU-MIMO scheme, and may be given as equations 4-1 and 4-2.

$$\hat{X}_{MIMO} = [H^H H + \sigma^2 I]^{-1} H^H Y(k) \quad (4\text{-}1)$$

$$\begin{bmatrix} \hat{x}_0 \\ \hat{x}_1 \end{bmatrix} = \quad (4\text{-}2)$$

$$\begin{bmatrix} |h_{00}|^2 + |h_{10}|^2 + \sigma^2 & h_{00}^* h_{01} + h_{10}^* h_{11} \\ h_{00} h_{01}^* + h_{10} h_{11}^* & |h_{01}|^2 + |h_{11}|^2 + \sigma^2 \end{bmatrix}^{-1} \begin{bmatrix} h_{00}^* y_0 + h_{10}^* y_1 \\ h_{01}^* y_0 + h_{11}^* y_1 \end{bmatrix}$$

In equations 4-1 and 4-2, $\sigma^2$ denotes the power of white noise, and Y(k) denotes a signal vector of the demapping signals. Referring to Eq. 4, interference signals may be left in the first channel compensation signal X(k) due to some values associated with channel characteristics affecting the signals of two terminals, and reception efficiency depends on magnitudes of the interference signals.

Inverse discrete Fourier transforming (IDFT) units 116a and 116b may transform from the frequency-domain to the time-domain for the first channel compensation signals X(k). Demodulating units 117a and 117b may demodulate the first channel compensation signals in the time-domain to form demodulation signals. Decoding units 118a and 118b may decode the demodulation signals to form the received data of every terminal. The number of IDFT units 116a and 116b, demodulating units 117a and 117b and decoding units 118a and 118b of receiving data unit 110 may depend on the number of terminals from which the interference cancellation device 100 receives the receiving signals.

Selective output unit 120 may classify the received data into first received data and second received data by examining cyclic redundancy codes (CRCs) included in the received data of every terminal. The first received data includes the interference signals and has low reliability, while the second received data does not include the interference signals and has high reliability. If a vague CRC is included in the received data, the received data is considered to include the interference signals so that the received data is classified as the first received data. If a clear CRC is included in the received data, the received data is considered as not including the interference signals so that the received data is classified as the second received data. Selective output unit 120 may also output channel estimation value selective signals corresponding to the first and the second received data for extracting the interference signals. For the second received data having the clear CRC (CRC OK), any additional signal processes are not needed, and only the channel estimation value selective signals of the second received data may be used at interference signal generating unit 130. In other words, the second received data from one terminal do not need to remove the interference signals caused by the other terminals. Thus, the complexity may be reduced compared to the subtractive interference cancellation method in which the interference cancellation is applied to all of the received signals from the terminals. For more simplicity, selective output unit 120 may transmit the received data to an upper layer and may stop the data receiving process without removing the interference signals when it is determined that the reliability of all the interference signals to be subtracted is low, or all signals are processed completely. In selective output unit 120, the CRC is used to determine whether or not to remove the interference signals since the reliability on the interference signals depends on the information indicating the existence of errors in the CRCs. If it is determined that all of the CRCs included in the receiving data of a specific terminal are clear (CRC OK), it may be assumed that reliability on playback signals of a user's data is maximum. Therefore, the complexity of the interference signal removing process may be reduced by solving the reliability determination problem. In this embodiment, the information of the CRC is used to determine the reliability of the subtraction. Instead of the CRC, any reliable information such as the Signal to Interference and Noise Ratio (SINR) may also be used.

Figure 5:
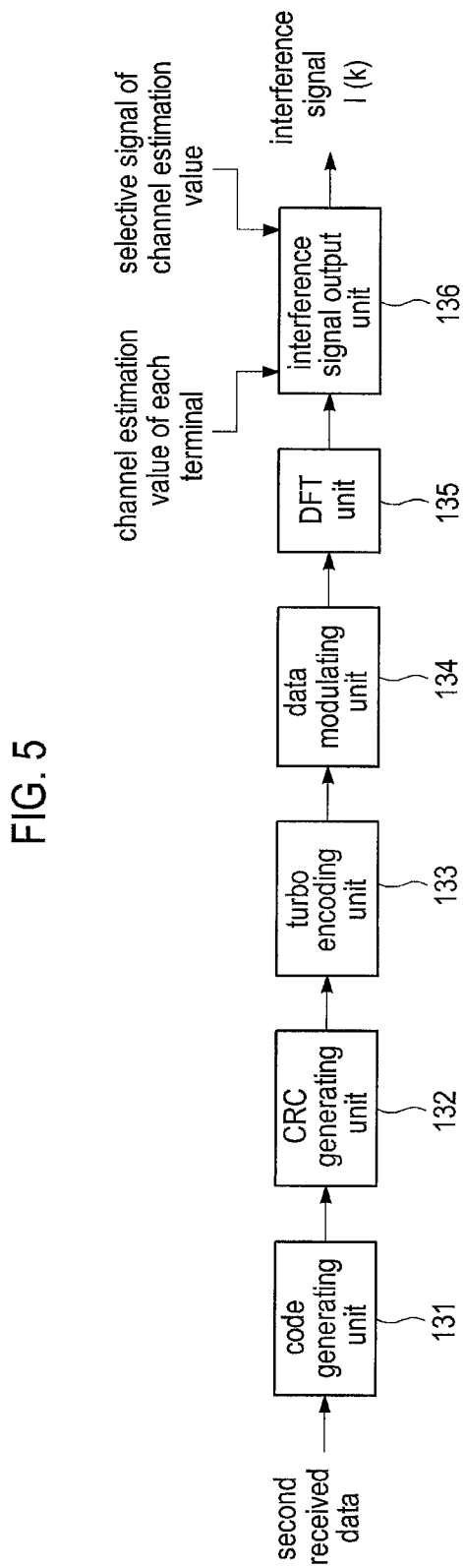
FIG. 5 is a block diagram of an interference signal generating unit.

Referring to FIG. 5, interference signal generating unit 130 may perform processes of generating coding block 131, generating CRCs 132, turbo encoding 133, data modulating 134 and discrete Fourier transform (DFT) 135. Interference signal generating unit 130 may receive the estimated channel values of the first and second received data from channel estimating unit 114 and the selective signals of the channel estimation values from selective output unit 120 to form interference signals I(k) from the second received data that has undergone the DFT.

Interference removing unit 141 of single input multiple output (SIMO) receiving unit 140 may remove the interference signal I(k) in the demapping signal Y(k) input from MU-MIMO receiving unit 110 to output interference free signals Y'(k), given as equation 5.

$$Y'(k) = Y(k) - I(k)$$

SIMO equalizing unit 142 may receive the interference free signals Y'(k) from interference removing unit 141 and the channel estimation values from channel estimation unit 114 to form output signals, i.e., second channel compensation signals, expressed as equation 6.

$$\hat{X}_{SIMO} = \frac{H_1^*}{(H_1^H H_1) + \sigma^2} Y'(k) \tag{6}$$

In Eq. 6, $\sigma^2$ denotes the power of white noise, and Y'(k) denotes a signal vector of the interference free signals.

Inverse discrete Fourier transforming (IDFT) unit 143 may transform the frequency-domain to the time-domain for the output signals of SIMO equalizer 142. Demodulating unit 144 may demodulate the output signals in the time-domain. Decoder 144 may decode the output signals to form decoded signals. CRC checking unit 146 may check the CRC included in the decoded signals and may output interference free first receiving data, transmit to the upper layer and complete the receiving process.

As mentioned above, interference cancellation device 100 may reduce the complexity by removing the interference signals in the frequency-domain compared with the conventional subtraction receiving unit of CDMA which cancels the interference in the time-domain.

Figure 6:
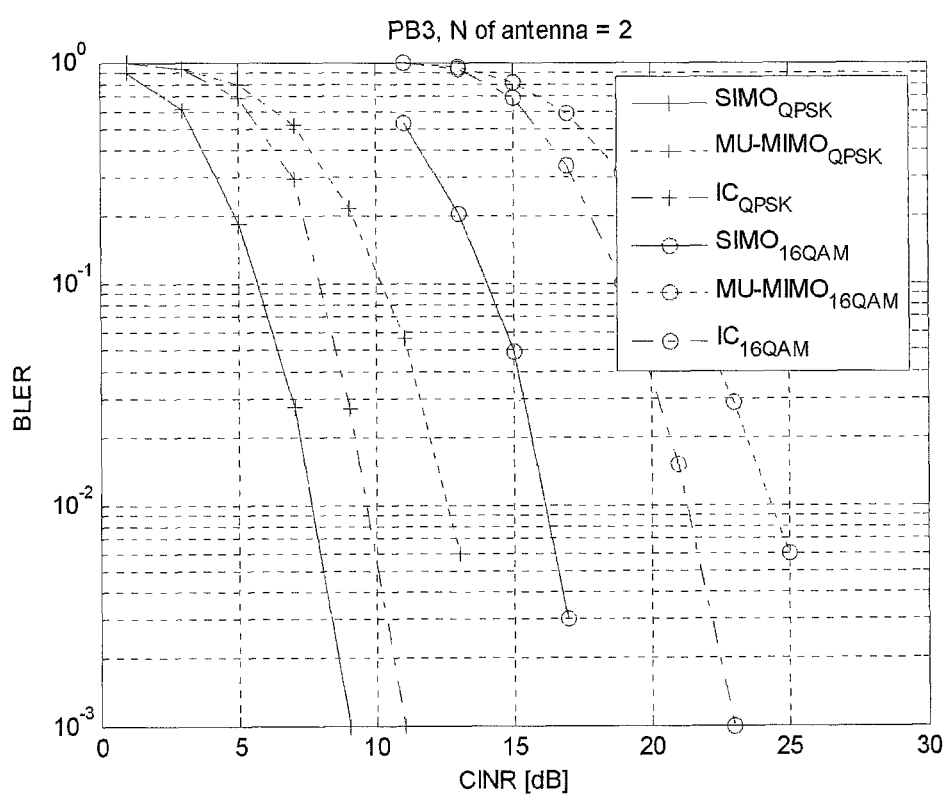
FIG. 6 is a graph showing performance of interference cancellation of the present invention with comparison to that of the prior art.

FIG. 6 shows a result of a simulation performed under conditions of QPSK coding rate 0.67, 16-QAM coding rate 0.76 and 432 numbers of subcarriers. FIG. 16 denotes that performance gain can be increased by 2 dB~3 dB in QPSK and 16-QAM by using the method in accordance with the embodiment of the present invention.

In another embodiment, an SC-FDMA system may be configured to perform a method of spatial division multiple access (SDMA). The SC-FDMA system may include a plurality of receiving antennas to form plural beams for each sector. If the SC-FDMA system includes four receiving antennas and two terminals are simultaneously scheduled, the channel response matrix H may be extended as expressed in equation 7.

$$H = [H_1 H_2] = \begin{bmatrix} h_{11} & h_{12} \\ h_{21} & h_{22} \\ h_{31} & h_{32} \\ h_{41} & h_{42} \end{bmatrix} \tag{7}$$

If the two terminals are in an overlapping area, the above embodiment may be adjusted to four antennas, which may be considered as a special case of the 2×2 MU-MIMO even though one terminal is allocated to one beam. In this case the channel response matrix may be given as equation 8.

$$H = [H_1 H_2] = \begin{bmatrix} h_{11} & 0 \\ h_{21} & 0 \\ 0 & h_{32} \\ 0 & h_{42} \end{bmatrix} \tag{8}$$

In equation 8, $h_{12}$, $h_{22}$, $h_{31}$ and $h_{41}$ are expressed as zero, however those may have some real amount. Thus, interferences among the terminals may be generated. For this case, the interference cancellation method in accordance of the present invention may be adopted to improve performance.

Although embodiments have been described with reference to a number of illustrative embodiments thereof, it should be understood that numerous other modifications and embodiments can be devised by those skilled in the art that will fall within the scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A single carrier frequency division multiple access (SC-FDMA) system comprising:
a receiving data forming unit configured to form channel estimation values and receive data of a plurality of terminals with receiving signals transmitted from respective terminals, wherein the receiving signals include cyclic prefixes (CPs), cyclic redundancy codes (CRCs) and subcarriers;
a selective output unit configured to classify the data of a plurality of terminals into first received data and second received data, wherein the first received data has lower reliability and the second received data has higher reliability than the first received data;
an interference signal generating unit configured to form interference signals from the second received data based on the channel estimation value; and
a single input multiple output (SIMO) receiving unit configured to remove the interference signals from the first received data and to transmit the interference free first received data to an upper layer,
wherein the receiving data forming unit comprises:
a CP removing unit configured to remove CPs included in the receiving signals of a time-domain;
a fast Fourier transforming (FFT) unit configured to form conversion signals by performing a transformation from the time-domain to a frequency-domain;
a subcarrier demapping unit configured to form demapping signals by extracting the subcarriers from the conversion signals;
a channel estimating unit configured to receive the demapping signals and to estimate channel values of every terminal;
a multi-user multiple input multiple output (MU-MIMO) equalizing unit configured to receive the channel values estimated by the channel estimating unit and the demapping signals, and to form first channel compensation signals;
inverse discrete Fourier transforming (IDFT) units configured to transform from the frequency-domain to the time-domain for the channel compensation signals;
demodulating units configured to demodulate the channel compensation signals in the time-domain to form demodulation signals; and
decoding units configured to decode the demodulation signals to form the data of a plurality of terminals.

2. The SC-FDMA system of claim 1, wherein the selective output unit is further configured to transmit all of the data of a plurality of terminals to the upper layer when all of the data of the plurality of terminals are classified into the first received data or the second received data.

3. The SC-FDMA system of claim 1, wherein the selective output unit is further configured to output channel estimation value selective signals corresponding to the first and the second received data for extracting the interference signals for extracting the interference, and
the interference signal generating unit is further configured to perform processes of generating coding block, generating CRCs, turbo encoding, data modulation and discrete Fourier transform (DFT) and to receive the estimated channel values of the respective terminal and the channel estimation value selective signals for forming the interference signals.

4. The SC-FDMA system of claim 3, wherein the SIMO receiving unit comprises:
an interference removing unit configured to remove the interference signal in the demapping signal and to output interference free signals;
an SIMO equalizing unit configured to receive the interference free signals and the channel estimation values to form a second channel compensation signal;
an inverse discrete Fourier transforming (IDFT) unit configured to transform the frequency-domain to the time-domain for the second channel compensation signal;
a demodulating unit configured to demodulate the second channel compensation signal in the time-domain;
a decoder configured to decode the second channel compensation signal output signal to form a decoded signal; and
a CRC checking unit configured to check the CRC included in the decoded signals and to output interference free first received data.

5. A method of interference cancellation in a single carrier frequency division multiple access (SC-FDMA) system, the method comprising:
a) at a receiving data forming unit, forming channel estimation values and receiving data of a plurality of terminals with receiving signals transmitted from respective terminals, wherein the receiving signals include cyclic prefixes (CPs), cyclic redundancy codes (CRCs) and subcarriers;
b) at a selective output unit, classifying the receiving data into first receiving data and second receiving data, wherein the first receiving data has lower reliability and the second receiving data has higher reliability than the first receiving data and outputting channel estimation value selective signals corresponding to the first and the second receiving data for extracting the interference signals for extracting the interference;
c) at a selective output unit, transmitting the second receiving data to an upper layer;
d) at an interference signal generating unit, forming interference signals from the second receiving data based on the channel estimation; and
e) at a single input multiple output (SIMO) receiving unit, removing the interference signals from the first receiving data and transmitting interference free first receiving data to the upper layer,
wherein step a) further comprises:
at a CP removing unit, removing CPs included in the receiving signals of a time-domain;
at a fast Fourier transforming (FFT) unit, forming conversion signals by performing a transformation from the time-domain to a frequency-domain;
at a subcarrier demapping unit, forming demapping signals by extracting the subcarriers from the conversion signals;
at a channel estimating unit, receiving the demapping signals and estimating channel values of every terminal;
at a multi-user multiple input multiple output (MU-MIMO) equalizing unit, receiving the channel values estimated at the channel estimating unit and the demapping signals, and forming a first channel compensation signal;

at inverse discrete Fourier transforming (IDFT) units, transforming from the frequency-domain to the time-domain for the channel compensation signals;

at demodulating units, demodulating the channel compensation signals in the time-domain to form demodulation signals; and at decoding units, decoding the demodulation signals to form the receiving data of the respective terminals.

6. The method of claim 5, wherein step c) further comprises a step of transmitting all of the receiving data of the respective terminals to the upper layer when all of the receiving data are classified into the first receiving data or the second receiving data.

7. The method of claim 5, wherein step e) further comprises:

at an interference removing unit, removing the interference signal in the demapping signal and outputting interference free signals;

at an SIMO equalizing unit, receiving the interference free signals and the channel estimation values to form second channel compensation signals;

at an inverse discrete Fourier transforming (IDFT) unit, transforming the frequency-domain to the time-domain for the second channel compensation signals;

at a demodulating unit, demodulating the second channel compensation signals in the time-domain;

at a decoder, decoding the second channel compensation signals output signals to form decoded signals; and at a CRC checking unit, checking the CRC included in the decoded signals and outputting interference free first receiving data.

\* \* \* \* \*